United States Patent
Pan et al.

(10) Patent No.: US 11,036,091 B2
(45) Date of Patent: Jun. 15, 2021

(54) DISPLAY PANEL

(71) Applicant: Himax Display, Inc., Tainan (TW)

(72) Inventors: Po-Hung Pan, Tainan (TW); Ya-Jou Chen, Tainan (TW); Hsing-Lung Wang, Tainan (TW); Kuan-Hsu Fan-Chiang, Tainan (TW)

(73) Assignee: Himax Display, Inc., Tainan (TW)

( * ) Notice: Subject to any disclaimer, the term of this patent is extended or adjusted under 35 U.S.C. 154(b) by 123 days.

(21) Appl. No.: 16/195,872

(22) Filed: Nov. 20, 2018

(65) Prior Publication Data

US 2020/0159051 A1    May 21, 2020

(51) Int. Cl.
  *G02F 1/1339* (2006.01)
  *G02F 1/1335* (2006.01)
  *G02F 1/1337* (2006.01)
  *G02F 1/1362* (2006.01)
  *G02F 1/1333* (2006.01)

(52) U.S. Cl.
  CPC ...... *G02F 1/1339* (2013.01); *G02F 1/133512* (2013.01); *G02F 1/133723* (2013.01); *B32B 2457/202* (2013.01); *B32B 2457/208* (2013.01); *C09K 2323/02* (2020.08); *C09K 2323/05* (2020.08); *G02F 1/1333* (2013.01);
  (Continued)

(58) Field of Classification Search
  CPC ............. G02F 1/1339; G02F 1/133723; G02F 1/133512; G02F 2001/133773; C09K 2323/05; C09K 2323/02; B32B 2457/202; B32B 2457/208
  See application file for complete search history.

(56) References Cited

U.S. PATENT DOCUMENTS 6,163,360 A * 12/2000 Tanaka ............... G02F 1/141
                                                         349/172
2004/0174114 A1 * 9/2004 Ohishi .............. H01J 31/127
                                                         313/495
(Continued)

FOREIGN PATENT DOCUMENTS

CN    102629033    8/2012
CN    108828845    11/2018
(Continued)

OTHER PUBLICATIONS

"Office Action of Taiwan Counterpart Application," dated Dec. 11, 2019, p. 1-p. 12.

*Primary Examiner* — Anthony J Frost
(74) *Attorney, Agent, or Firm* — JCIPRNET

(57) ABSTRACT

A display panel may have a first region and a second region encircled by the first region. The display panel may include first substrate, second substrate, sealant, conductive layer, and display medium layer. The first substrate may have a first recess in the first region. The second substrate may be disposed opposite to the first substrate. The sealant may be disposed between the first and second substrates, and may be received by the first recess. The conductive layer may be disposed on the first substrate, cover the first recess in a conformal manner, and be interposed between the first substrate and the sealant. The display medium layer may be disposed between the first and second substrates and may be encircled by the sealant. A thickness of the sealant may be larger than a distance between the first substrate and the second substrate in the second region.

19 Claims, 11 Drawing Sheets

100A

(52) U.S. Cl.
CPC .. *G02F 1/133302* (2021.01); *G02F 1/133773* (2021.01); *G02F 1/136277* (2013.01)

(56) References Cited

U.S. PATENT DOCUMENTS

| | | | | |
|---|---|---|---|---|
| 2007/0146563 | A1* | 6/2007 | Yun | G02F 1/1337 349/36 |
| 2014/0168540 | A1* | 6/2014 | Wang | G06F 3/044 349/12 |
| 2016/0077376 | A1* | 3/2016 | Lee | G02F 1/1339 349/106 |
| 2016/0161804 | A1* | 6/2016 | Zhang | C09K 3/1018 349/123 |
| 2016/0291374 | A1* | 10/2016 | Fan | G02F 1/13394 |
| 2017/0038635 | A1* | 2/2017 | Yanagisawa | G02F 1/134336 |
| 2017/0146834 | A1* | 5/2017 | Tak | G02F 1/133514 |

FOREIGN PATENT DOCUMENTS

| | | |
|---|---|---|
| JP | H08211395 | 8/1996 |
| TW | 200739190 | 10/2007 |

\* cited by examiner

DISPLAY PANEL

BACKGROUND OF THE INVENTION

1. Field of the Invention

The present disclosure generally relates to an electronic device, in particular, to a display panel.

2. Description of Related Art

In a typical display panel, a display medium layer is sandwiched between a first substrate and a second substrate. The two substrates are kept together via a sealant to form a display cell. A thickness of the display medium layer may influence the optical properties of the display panel. The sealant might assist to maintain a certain distance between the first substrate and the second substrate. Structural requirements of other components of the display panel might have to be considered when designing display panels with thin display medium layers.

SUMMARY OF THE INVENTION

Accordingly, the present disclosure is directed to a display panel including a substrate having a recess, and a sealant received by the recess.

According to an embodiment, a display panel may have a first region and a second region encircled by the first region. The display panel may include a first substrate, a second substrate, a sealant, a conductive layer, and a display medium layer. The first substrate may have a first recess in the first region. The second substrate may be disposed opposite to the first substrate. The sealant may be disposed between the first substrate and the second substrate, and may be received by the first recess. The conductive layer may be disposed on the first substrate, may cover the first recess in a conformal manner, and may be interposed between the first substrate and the sealant. The display medium layer may be disposed between the first substrate and the second substrate and may be encircled by the sealant. A thickness of the sealant may be larger than a distance between the first substrate and the second substrate in the second region of the display panel.

According to an embodiment, a width of the first recess may be greater than a width of the sealant.

According to an embodiment, the display panel may further have a third region. The first region may be positioned between the third region and the second region, and the conductive layer disposed on the first substrate may continuously extend from the second region, pass through the first region and reach the third region to cover the first recess in a conformal manner.

According to an embodiment, the first substrate may have a first thickness at the first region, a second thickness at the second region and a third thickness at the third region, and the first thickness may be smaller than either the second thickness or the third thickness.

According to an embodiment, side surfaces of the first recess may be tapered.

According to an embodiment, a display panel may further include a light shielding layer disposed on an outer surface of the first substrate further away from the display medium layer. A vertical projection of the first recess may fall on the light shielding layer.

According to an embodiment, a width of the light shielding layer may be larger than a maximum width of the first recess.

According to an embodiment, a depth of the first recess may be smaller than a half of the thickness of the first substrate at the second region.

According to an embodiment, a thickness of the display medium layer may be smaller than 2 µm.

According to an embodiment, the second substrate may include a base plate and a passivation layer disposed over the base plate, a second recess may be formed in the passivation layer at the first region, and the sealant may be received by the second recess.

According to an embodiment, the second substrate may further include an active device layer covered by the passivation layer. The passivation layer may be interposed between the sealant and a portion of the active device layer.

According to an embodiment, the base plate may be a silicon bulk and the active device layer may include a plurality of complementary metal-oxide-semiconductor devices formed in the silicon bulk.

According to an embodiment, the sealant may include a sealing material and a plurality of fillers distributed in the sealing material.

According to an embodiment, the display panel may further include a first alignment layer disposed between the display medium layer and the first substrate and a second alignment layer disposed between the display medium layer and the second substrate.

According to an embodiment, one or both of the first alignment layer and the second alignment layer may include an inorganic alignment layer and an organic alignment layer, the inorganic alignment layer may be spaced from the sealant by a gap, and the organic alignment layer may be located in the gap to be in contact with the sealant.

According to an embodiment, a display panel may have a first region and a second region encircled by the first region. The display panel may include a first substrate, a second substrate, a sealant, and a display medium layer. The second substrate may be disposed opposite to the first substrate. The second substrate may include a silicon bulk and a passivation layer disposed on the silicon bulk. A recess may be formed in the passivation layer at the first region. The sealant may be disposed between the first substrate and the second substrate, and be received by the recess. A display medium layer may be disposed between the first substrate and the second substrate, and be encircled by the sealant. A thickness of the sealant may be larger than a distance between the first substrate and the second substrate in the second region of the display panel.

According to an embodiment, the second substrate may further include an active device layer formed in the silicon bulk and covered by the passivation layer, and the passivation layer may be interposed between the sealant and a portion of the active device layer.

According to an embodiment, the passivation layer may include a first insulation layer and a second insulation layer stacked on the first insulation layer.

According to an embodiment, a depth of the recess may be insufficient to pass throughout a thickness of the first insulation layer.

According to an embodiment, the display panel may further include a first alignment layer disposed between the display medium layer and the first substrate and a second alignment layer disposed between the display medium layer and the second substrate.

According to an embodiment, one or both of the first alignment layer and the second alignment layer may include an inorganic alignment layer and an organic alignment layer, the inorganic alignment layer may be spaced from the sealant by a gap, and the organic alignment layer may be located in the gap to be in contact with the sealant.

According to an embodiment, the display panel may further have a third region. The first region may be positioned between the third region and the second region, and the first alignment layer and the second alignment layer may be absent in the third region.

According to an embodiment, a thickness of the display medium layer is smaller than 2 μm.

In view of the above, a display panel in accordance with some embodiments of the disclosure has a first region surrounding a second region, and includes one or both of a first substrate and a second substrate having a recess in the first region. A sealant is disposed between the first substrate and the second substrate and is received in the recess. A distance between the first substrate and the second substrate in the second region may be smaller than a thickness of the sealant. Accordingly, sealing with low compressibility may be used even in the display panels requiring a small thickness of the display medium layer.

BRIEF DESCRIPTION OF THE DRAWINGS

The accompanying drawings are included to provide further understanding of the disclosure, and are incorporated in and constitute a part of this specification. The drawings illustrate embodiments of the disclosure and, together with the description, serve to explain the principles of the disclosure.

Figure 1:
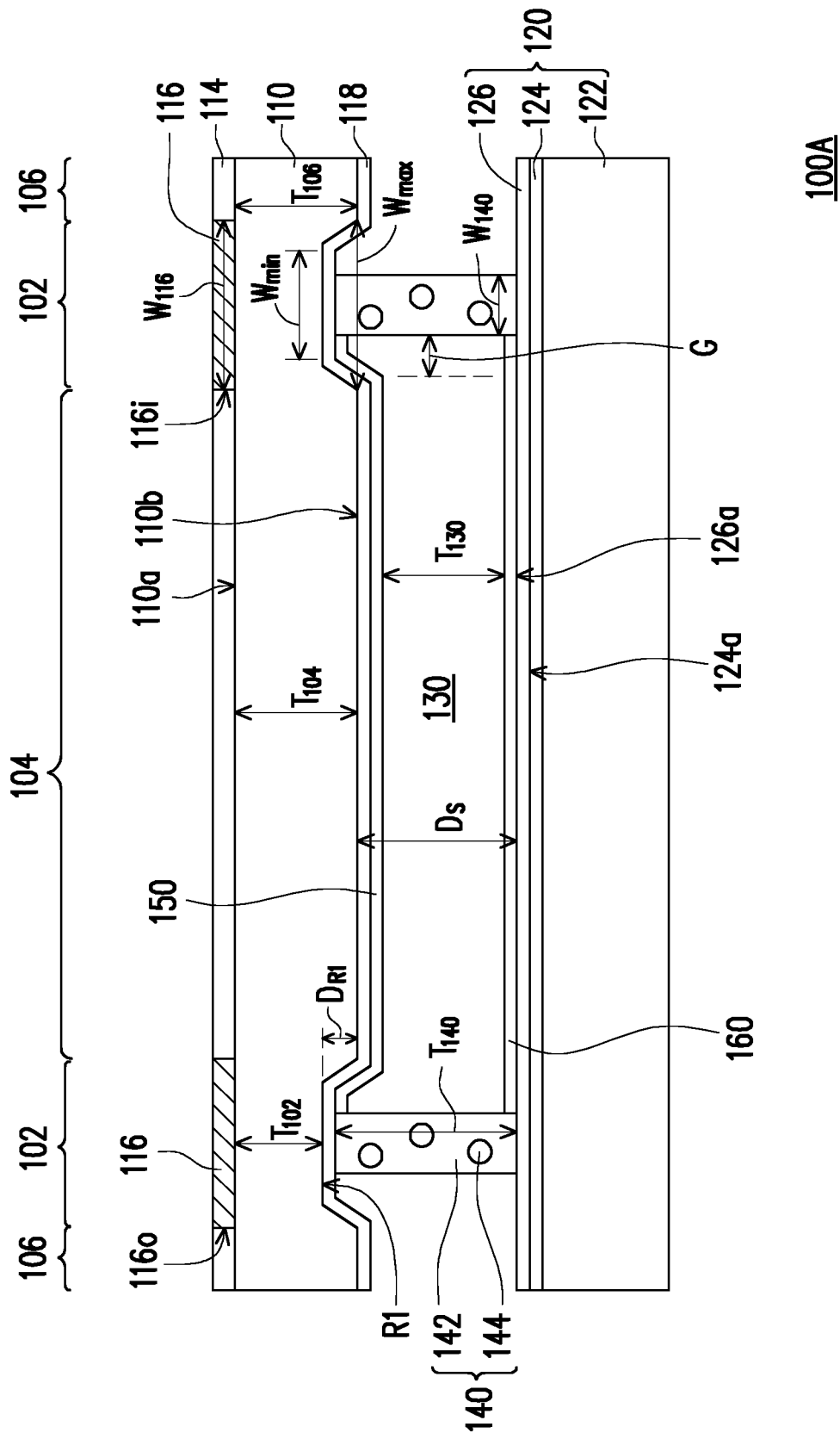
FIG. 1 shows a schematic cross-sectional view of a display panel according to an embodiment of the present disclosure.

In the drawings, the relative dimensions of the illustrated components might have been altered for the sake of clarity.

DESCRIPTION OF THE EMBODIMENTS

Reference will now be made in detail to the present preferred embodiments of the disclosure, examples of which are illustrated in the accompanying drawings. Wherever possible, the same reference numbers are used in the drawings and the descriptions to refer to the same or like parts.

In the disclosure, the locution "an element A is disposed on an element B", used to describe a positional relationship, encompasses the possibilities of one or multiple other elements disposed between the element A and the element B, as well as the case of no other elements existing between the element A and the element B.

FIG. 1 shows a cross-sectional view of a display panel 100A according to some embodiments of the present disclosure. As shown in the cross-sectional view of FIG. 1, the display panel 100A includes a first substrate 110, a second substrate 120 opposite to the first substrate 110, a display medium layer 130, and a sealant 140. The first substrate 110 and the second substrate 120 are assembled via the sealant 140. The display medium layer 130 is sandwiched between the first substrate 110 and the second substrate 120 and is surrounded by the sealant 140. The display medium layer 130 may be made of liquid crystals, so that the first substrate 110, the second substrate 120, the display medium layer 130, and the sealant 140 may serve as a liquid crystal cell, but the disclosure is not limited thereto. In some embodiments, a first alignment layer 150 may be selectively disposed between the first substrate 110 and the display medium layer 130, and a second alignment layer 160 may be selectively disposed between the display medium layer 130 and the second substrate 120.

In some embodiments, the display panel 100A further includes an anti-reflective layer 114 and a light shielding layer 116 disposed on a first surface 110a of the first substrate 110. In some embodiments, the first substrate 110 may be made of glass, but the disclosure is not limited thereto. In some embodiments, the first surface 110a of the first substrate 110 is a surface farther away from the display medium layer 130. A material of the anti-reflective layer 114 may include silicon oxide, titanium oxide, or a combination of both.

In some embodiments, the light shielding layer 116 has a frame-like pattern when viewed from top, but the disclosure is not limited thereto. In some alternative embodiments, the light shielding layer 116 may be disposed following other patterns or layers, according to the requirements of the design. In some embodiments, both the anti-reflective layer 114 and the light shielding layer 116 may be in physical contact with the first substrate 110 and bottom surfaces of the anti-reflective layer 114 and the light shielding layer 116 may be coplanar. In other words, the anti-reflective layer 114 may be absent from the regions where the light shielding layer 116 is disposed, but the disclosure is not limited thereto. In some alternative embodiments, the anti-reflective layer 114 may extend over the whole first surface 110a of the first substrate 110, and be disposed between the light shielding layer 116 and the first substrate 110. Namely, the anti-reflective layer 114 may be sandwiched between the light shielding layer 116 and the first substrate 110.

The light shielding layer 116 has a light shielding effect. The display light of the display panel 100A may be obstructed or shielded by the light shielding layer 116 in a first region 102 of the display panel 100A, so that a displayed image may be presented in a second region 104 beside the first region 102. In other words, the second region 104 may be a display area of the display panel 100A. In some embodiments, the first region 102 has a frame-like pattern when viewed from the top, and surrounds the second region 104. A boundary between the first region 102 and the second region 104 of the display panel 100A may be defined by an inner edge 116i of the light shielding layer 116. Another boundary of the first region 102 may be defined by an outer edge 116o opposite to the inner edge 116i of the light shielding layer 116. In some embodiments, the outer edge 116o defines the boundary of the first region 102 and a third region 106 of the display panel 100A. The third region 106 may be considered an outermost peripheral region of the display panel 100A, and may be omitted in some embodiments. The light shielding layer 116 may present a sharp pattern, with the inner edge 116i and the outer edge 116o showing good linearity. A material for the light shielding layer 116 may include organic inks, but the disclosure is not limited thereto.

In some embodiments, the first substrate 110 may present a first recess R1 in the first region 102 of the display panel 100A. The first recess R1 is formed in the first region 102 in a second surface 110b of the first substrate 110 opposite to the first surface 110a, so that the second surface 110b of the first substrate 110 presents an uneven profile. In some embodiments, a cross section of the first recess R1 may have a trapezoidal shape. That is, the first recess R1 may present a minimum width $W_{min}$ at a bottom of the first recess R1 deep within the first substrate 110, and a maximum width $W_{max}$ greater than the minimum width $W_{min}$ where the first recess R1 starts recessing into the first substrate 110. In other words, the side surfaces of the first recess R1 may be tapered. In some alternative embodiments, the side surfaces of the first recess R1 may not be tapered and thus the maximum width $W_{max}$ and the minimum width $W_{min}$ may be the same. The first recess R1 may have a frame-like pattern when viewed from top, similar to the pattern of the light shielding layer 116. In some embodiments, the light shielding layer 116 may be deposited following the pattern of the first recess R1, so that a vertical projection of the first recess R1 falls on the light shielding layer 116. In some embodiments, the first recess R1 is entirely contained within the first region 102 of the display panel 100A. That is, in some embodiments, the vertical projection of the first recess R1 falls completely within a span of the light shielding layer 116. In some embodiments, a width $W_{116}$ of the light shielding layer 116 is not smaller than a maximum width $W_{max}$ of the first recess R1.

In some embodiments, the first substrate 110 presents a first thickness $T_{102}$ at the first region 102, a second thickness $T_{104}$ at the second region 104, and a third thickness $T_{106}$ at the third region 106. Because of the first recess R1, the first thickness $T_{102}$ may be smaller than either the second thickness $T_{104}$ or the third thickness $T_{106}$. In some embodiments, the first thickness $T_{102}$ is not less than a half of the second thickness $T_{104}$. In other words, a depth $D_{R1}$ of the first recess R1 is smaller than a half of the second thickness $T_{104}$ of the first substrate 110 at the second region 104.

The display panel 100A further includes a conductive layer 118 disposed on a second surface 110b of the first substrate 110. The second surface 110b may be the surface of the first substrate 110 closer to the display medium layer 130. In some embodiments, the conductive layer 118 may extend over the entire second surface 110b of the first substrate 110. In some embodiments, the conductive layer 118 is disposed conformally over the second surface 110b of the first substrate 110. That is, a profile of the conductive layer 118 follows a profile of the second surface 110b of the first substrate 110, so that the conductive layer 118 conforms to the first recess R1. In other words, the conductive layer 118 is disposed on the first substrate 110, and continuously extends from the second region 104, passes through the first region 102 and reaches the third region 106 to cover the first recess R1 in a conformal manner. In the first region 102 of the display panel 100A, the conductive layer 118 is disposed between the first substrate 110 and the sealant 140. In the second region 104 of the display panel 100A, the conductive layer 118 is disposed between the first substrate 110 and the display medium layer 130. In some embodiments, a material of the conductive layer 118 includes ITO or any other material that is conductive and transparent to the display light.

The second substrate 120 may be a transistor array substrate comprising a base plate 122, such as a glass plate or a silicon backplane formed of a silicon bulk, and an active device layer 124 disposed thereon. In some embodiments, the active device layer 124 and the conductive layer 118 may be used for providing the driving electric field to drive the display medium layer 130. In some embodiments, the second substrate 120 may further optionally include a passivation layer 126 disposed over the active device layer 124. The active device layer 124 may be a thin film transistor array, a CMOS (Complementary Metal-Oxide Semiconductor) device array, or the like. Accordingly, the display panel 100A may be a Thin Film Transistor Liquid Crystal Display (TFT-LCD) panel or an LCoS (Liquid Crystal on Silicon) display panel.

In some embodiments, the display medium layer 130 may be disposed between the first substrate 110 and the second substrate 120 and fill the space surrounded by the first substrate 110, the second substrate 120 and the sealant 140. The display medium layer 130 may further extend from the second region 104 into the first region 102. That is, a small portion of the display medium layer 130 may be covered by the light shielding layer 116. A thickness $T_{130}$ of the display medium layer 130 is referred to as a "cell gap". Some optical properties of the display medium layer 130 such as the phase retardation may be influenced by the cell gap and the light transmittance of the display panel 100A is generally related to the phase retardation of the display medium layer 130. For some applications, it might be preferable to use a thinner display medium layer. For example, a reflective liquid crystal display panel generally requires a smaller cell gap than a transmissive liquid crystal display panel. Or, the display medium layer having higher value of birefringence may require a smaller cell gap to achieve the desired phase retardation. In some embodiment, a thickness $T_{130}$ of the display medium layer 130 may be smaller than 2 μm. To achieve a small cell gap, a distance $D_S$ between the first substrate 110 and the second substrate 120 in the second region 104 may be comparably small. In the present embodiment, the distance $D_S$ is measured as the distance between the second surface 110b of the first substrate 110 and a surface 126a of the passivation layer 126 closer to the display medium layer 130. In some embodiments in which the passivation layer 126 is not included, the distance $D_S$ is measured between the second surface 110b of the first substrate 110 and a surface 124a of the active device layer 124 closer to the display medium layer 130.

The sealant 140 is disposed in the first region 102 of the display panel 100A and is sandwiched between the first substrate 110 and the second substrate 120. In some embodiments, the sealant 140 may contact the conductive layer 118 on the first substrate 110, and the passivation layer 126 (if included) on the second substrate 120. In some embodiments, by leaning against the first substrate 110 at one end and the second substrate 120 at the other end, the sealant 140 may contribute to the stabilization of the distance $D_S$ between the first substrate 110 and the second substrate 120. In some embodiments, the sealant 140 encircles the display medium layer 130. In some embodiments, the sealant 140 has a frame-like structure surrounding the display medium layer 130 when viewed from top. In some embodiments, the sealant 140 is received in the first recess R1 of the first substrate 110. In some embodiments, the maximum width $W_{max}$ and the minimum width $W_{min}$ of the first recess R1 are greater than a width $W_{140}$ of the sealant 140, but the disclosure is not limited thereto. In some embodiments, the width $W_{140}$ of the sealant 140 is comparable to the minimum width $W_{min}$ of the first recess R1. That is, the sealant 140 may fill the bottom of the first recess R1. In some alternative embodiments, the first recess R1 may have a constant width and the sealant 140 may have the width $W_{140}$ not greater than the first recess R1 so as to be received in the first recess R1. In some embodiments, the light shielding layer 116 may be disposed in such a way to completely shield the sealant 140.

In some embodiments, the sealant 140 may include a sealing material 142 and a plurality of fillers 144 dispersed in the sealing material 142, but the disclosure is not limited thereto. In some embodiments, the sealant 140 may include only the sealing material 142 without the fillers 144. In some embodiments, the sealing material 142 may be a thermally curable material, a photochemically curable material, or a thermo-photocurable material. The sealing material 142 may include organic resins such as epoxy resin, polyurethane resins, furan-based resins, acrylate resins, or the like. A material of the fillers 144 may include glass fiber, plastics, siliconates, mica, or the like. The fillers 144, by being dispersed into the sealing material 142, may increase the structural stability of the sealant 140, and, as such, of the entire display panel 100A. When designing a display panel according to some embodiments of the disclosure, the cell gap $T_{130}$ and the distance $D_S$ have to be taken into account when choosing the material for the sealant 140. For example, one of the factors to be considered is how thin a material can be pressed. In some embodiments, by accommodating the sealant 140 into the first recess R1, a thickness $T_{140}$ of the sealant 140 may be greater than the distance $D_S$ between the first substrate 110 and the second substrate 120 in the second region 104, so that even less compressible materials can be used for the sealant 140. In some embodiments, the depth $D_{R1}$ of the first recess R1 and a concentration and a size of the fillers 144 may be adjusted to reach the desired thickness $T_{130}$ for the display medium layer 130. As such, when designing a display panel according to some embodiments of the disclosure, a material of the sealant 140 can be chosen from a wider range of candidate materials and small cell gaps (the thickness $T_{130}$), if so desired, are achievable without difficulty.

In some embodiments, the first alignment layer 150 and the second alignment layer 160 may be disposed between the display medium layer 130 and the first substrate 110 and between the display medium layer 130 and the second substrate 120, respectively. The first and second alignment layers 150 and 160 may be disposed within the enclosure formed by the sealant 140, and may extend in the second region 104 of the display panel 110A and at least part of the first region 102. The first and second alignment layers 150 and 160 may be absent from the third region 106 of the display panel 100A. The first and second alignment layers 150 and 160 may be respective an organic alignment layer or an inorganic alignment layer. A material used for the organic alignment layer may include polyimide, e.g. thermally curable polyimide or UV-curable polyimide. A material of the inorganic alignment layer may include silicon oxide ($SiO_x$), zinc oxide (ZnO) or nanoporous anodic aluminum oxide. In some embodiments, the first and second alignment layers 150 and 160 may extend to partially overlap the sealant 140 and be in contact with the sealant 140. The first alignment layer 150 is disposed on the conductive layer 118, and interposed between the conductive layer 118 and the display medium layer 130.

Figure 2A:
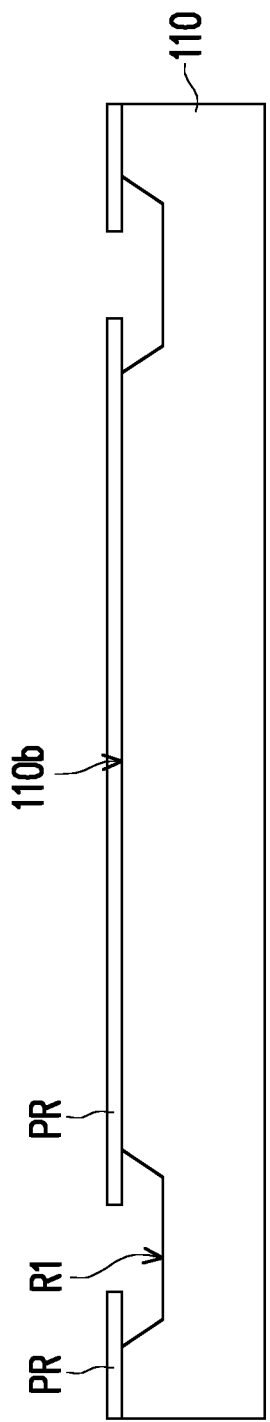
FIG. 2A to FIG. 2D show schematic cross-sectional views of a first substrate undergoing a portion of the steps of a fabricating method in accordance with an embodiment of the present disclosure.

The fabrication process of the display panel 100A of FIG. 1 may include the following steps, but is not limited thereto, and the order of the steps is also not limited to the order presented here. Cross-sectional views of some manufacturing intermediates according to some embodiments of the disclosure are shown in FIG. 2A-2E. As shown in FIG. 2A, a surface of the first substrate 110 is etched to be partially removed to form the first recess R1, where the etched surface is defined as the surface (110b) facing the display medium layer 140 in the finished display panel 100A as depicted in FIG. 1. The etching step may involve a wet etching step (for example with hydrofluoric acid) or a dry etching step (for example with plasma). In some embodiments, either anisotropic or isotropic etching conditions may be used. Specifically, a patterned photoresist PR may be used to shield from the etching agent portions of the first substrate 110 that are not be removed according to the intended design and may be removed from the first substrate 110 after the first recess R1 with the desired size and shape is formed.

Figure 2B:
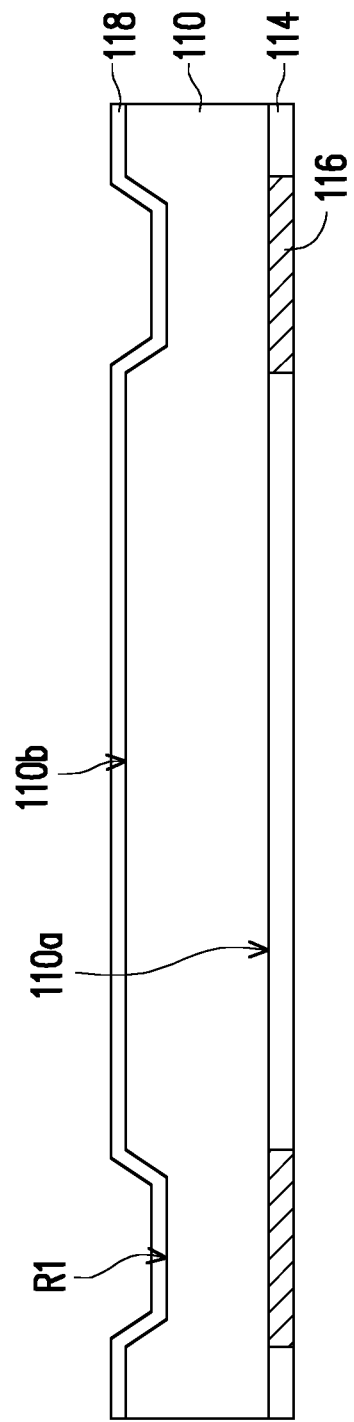

Subsequently, as shown in FIG. 2B, on the first surface 110a opposite to the surface 110b presenting the first recess R1, the anti-reflective layer 114 and the light shielding layer 116 may be formed (not necessarily in the recited order) and the conductive layer 118 is formed on the second surface 110b presenting the first recess R1 in a conformal manner. In some embodiments, the anti-reflective layer 114 is formed by the thermal deposition, and, if required, a pattern may be generated through auxiliary masks (not shown) either during the deposition step or during a subsequent etching step, but the disclosure is not limited thereto. In some embodiments, the light shielding layer 116 is formed by inkjet printing or super-inkjet printing.

Figure 2C:
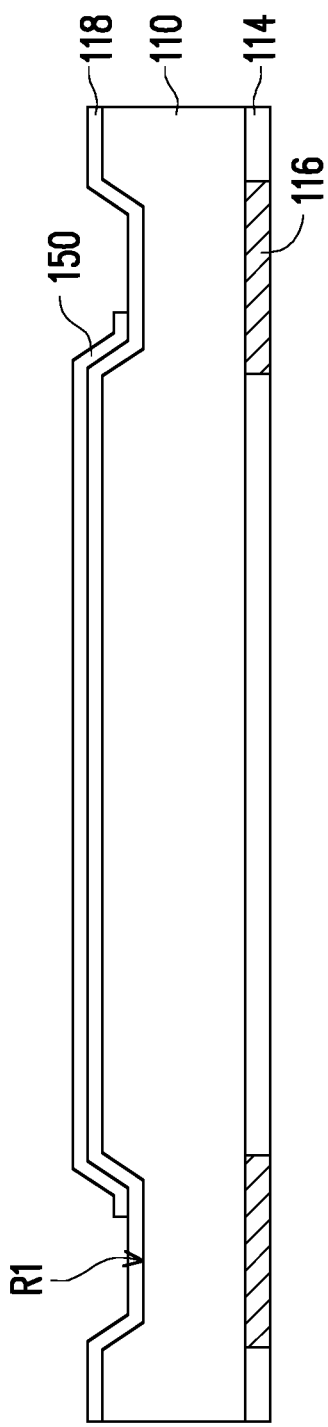
Figure 2D:
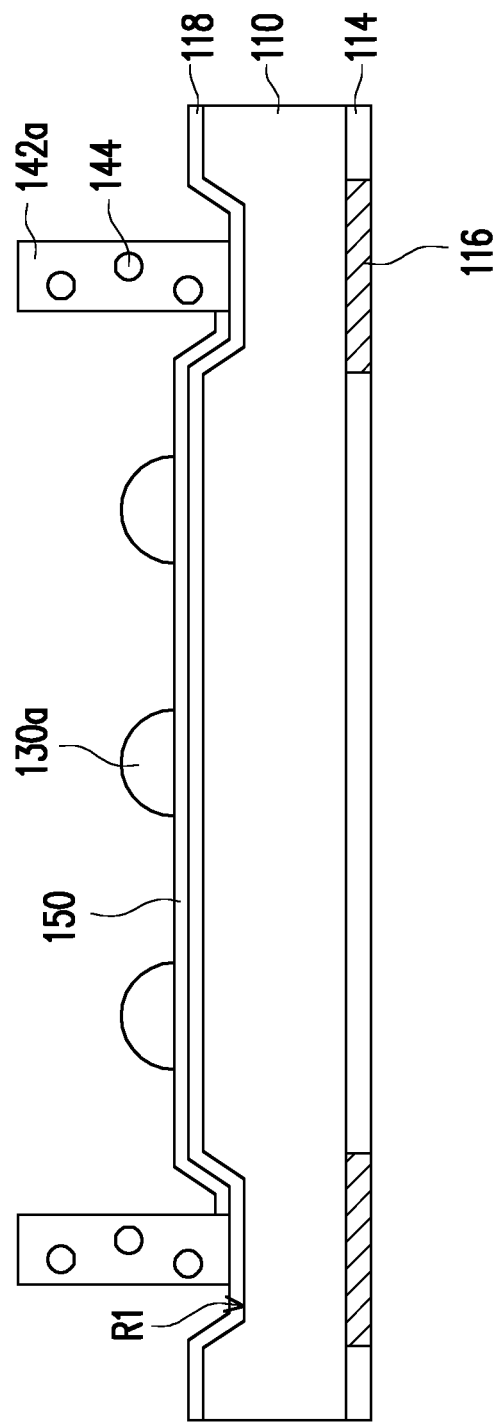

In FIG. 2C, the first alignment layer 150 is formed on top of the conductive layer 118. As shown in FIG. 2D, the sealing material 142a is dispensed in the first recess R1 of the first substrate 110. In some embodiments, the sealing material 142a is premixed with the fillers 144. In some embodiments, the sealing material 142a may be provided by dispensing, printing, or APR printing technology, but the disclosure is not limited thereto. The sealing material 142a though is not yet cured, has a certain viscosity to maintain the thickness without significantly spreading and extending outwardly. A display medium material 130a is dispensed on the first alignment layer 150 in the region surrounded by the sealing material 142a.

Subsequently, the first substrate 110 is assembled with the second substrate 120 (shown in FIG. 1) having the second alignment layer 160 (shown in FIG. 1) formed thereon. The second alignment layer 160 may have been formed on the second substrate 120 before the assembling step with the first substrate 110. During the assembling step, the sealing material 142a may be compressed. After assembling the second substrate 120 with the first substrate 110, a curing step may be performed to cure the compressed sealing material 142a. In some embodiments, the sealing material 142a may be a UV-curable sealant. In other words, an irradiation with a curing light having wavelength below about 400 nm (UV light) may be required. The curing light may have maximum intensity around 365 nm, depending on the material used for the sealing material 142a. Alternatively, the sealing material 142a may be mainly cured with UV light of wavelength of 365 nm. In some other embodiments, the sealing material 142a may be cured by heat, and a baking step may be performed. The temperature and the duration of the baking step may be selected according to the material used. Upon curing, formation of the display panel 100A shown in FIG. 1 may be complete.

As shown in FIG. 1, in some embodiments, after the assembly of the first substrate 110 with the second substrate 120 and the curing step, the thickness $T_{140}$ of the sealant 140 may be greater than the thickness $T_{130}$ of the display medium layer 130. Furthermore, the thickness $T_{140}$ of the sealant 140 may be greater than the distance $D_S$ between the first substrate 110 and the second substrate 120 in the second region 104.

Figure 3A:
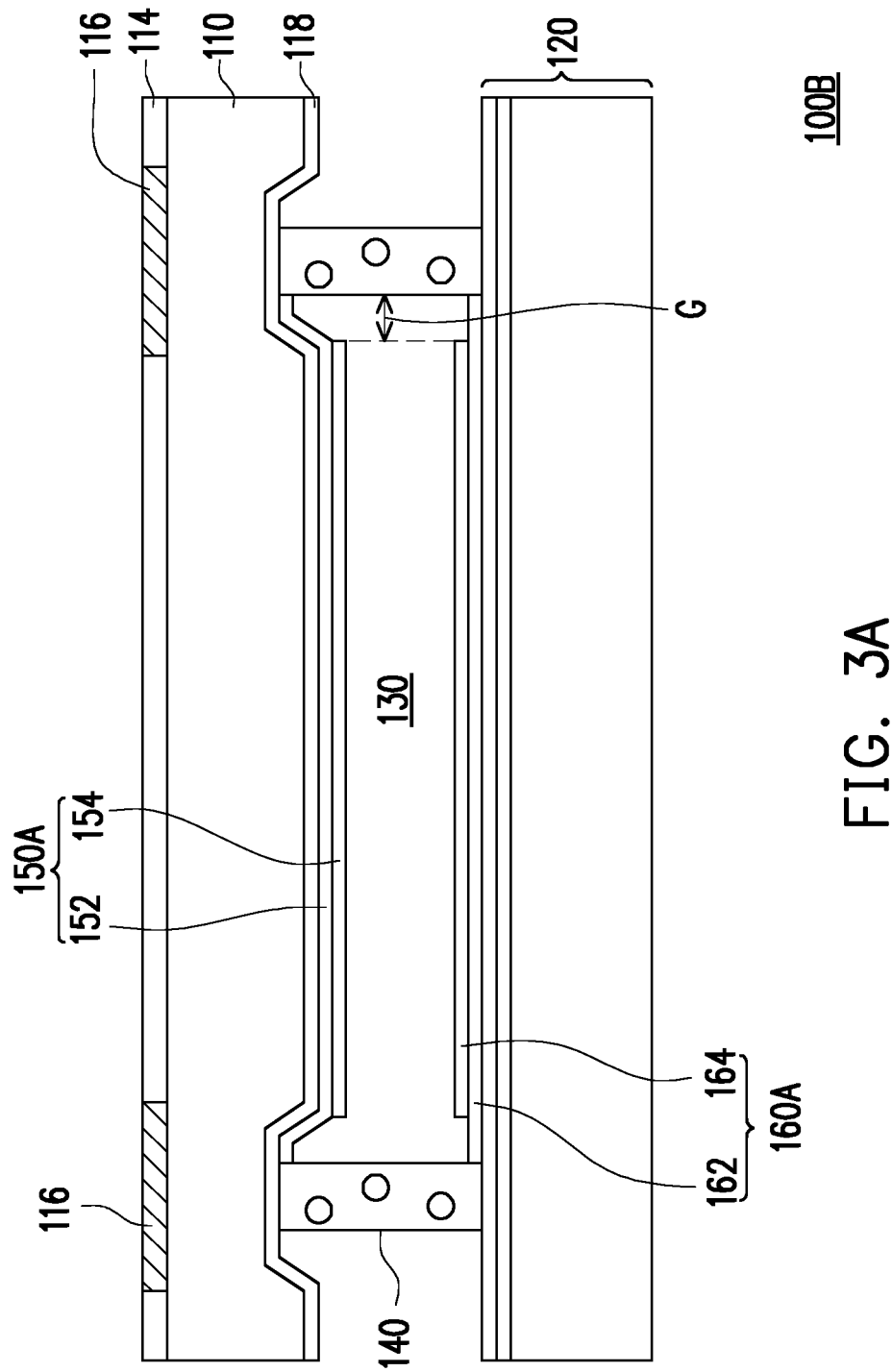
FIG. 3A to FIG. 3D show schematic cross-sectional views of a display panel according to some embodiments of the present disclosure.

In FIG. 3A is shown a cross-sectional view of a display panel 100B according to another embodiment of the present disclosure. The structure of the display panel 100B shown in FIG. 3A may be an implementing example of an embodiment of the present disclosure. The display panel 100B shown in FIG. 3A is similar to the display panel 100A shown in FIG. 1, and the same or similar reference numbers in the two embodiments represent the same or similar elements or components. The display panel 100B may include the first substrate 110, the anti-reflective layer 114, the light shielding layer 116, the conductive layer 118, the second substrate 120, the display medium layer 130, the sealant 140, the first alignment layer 150A, and the second alignment layer 160A. In the embodiment, the first alignment layer 150A includes a first organic alignment layer 152 and a first inorganic alignment layer 154, and the second alignment layer 160A includes a second organic alignment layer 162 and a second inorganic alignment layer 164.

In some embodiments, the first inorganic alignment layer 154 is stacked on top of the first organic alignment layer 152. That is, the first inorganic alignment layer 154 is disposed between the first organic alignment layer 152 and the display medium layer 130. In some alternative embodiments, the first organic alignment layer 152 and the first inorganic alignment layer 154 may be disposed on the first substrate 110 in a coplanar manner. Accordingly, the first organic alignment layer 152 may not be interposed between the first inorganic alignment layer 154 and the first substrate 110.

In some embodiments, the second inorganic alignment layer 164 is stacked on top of the second organic alignment layer 162. That is, the second inorganic alignment layer 164 is disposed between the second organic alignment layer 162 and the display medium layer 130. In some alternative embodiments, the second organic alignment layer 162 and the second inorganic alignment layer 164 may be disposed on the second substrate 120 in a coplanar manner. Accordingly, the second organic alignment layer 162 may not be interposed between the second inorganic alignment layer 164 and the second substrate 120.

The organic alignment layers 152 and 162 may extend continuously from the second region 104 to a part of the first region 102 within an inner perimeter of the sealant 140, and physically contact the inner edge of the sealant 140. The first and second inorganic alignment layers 154 and 164 may respectively be spaced apart from the sealant 140 by a gap G. That is, the first and second organic alignment layers 152 and 162 may be disposed in the gap G, whilst the inorganic alignment layers 154 and 164 may not extend within the gap G. The first and second organic alignment layers 152 and 162 and the first and second inorganic alignment layers 154 and 164 are in contact with the display medium layer 130. When the display medium layer 130 contains a liquid crystal material, the two alignment layers 150A and 160A are used for orientating the liquid crystal molecules and inducing a pre-tilt angle in the liquid crystal molecules.

A material used for the first and second organic alignment layers 152 and 162 may include polyimide. In some embodiments, the material of the first and second organic alignment layers 152 and 162 may include thermally curable polyimide or UV-curable polyimide. The first and second organic alignment layers 152 and 162 may have a thickness in a range of a couple of hundreds to a couple of thousands of angstroms. A material of the first and second inorganic alignment layers 154 and 164 may include silicon oxide ($SiO_x$), zinc oxide (ZnO) or nanoporous anodic aluminum oxide, but the disclosure is not limited thereto. Each of the first and second inorganic alignment layers 154 and 164 may have a thickness in the range from 200 to 2000 angstroms.

Figure 3B:
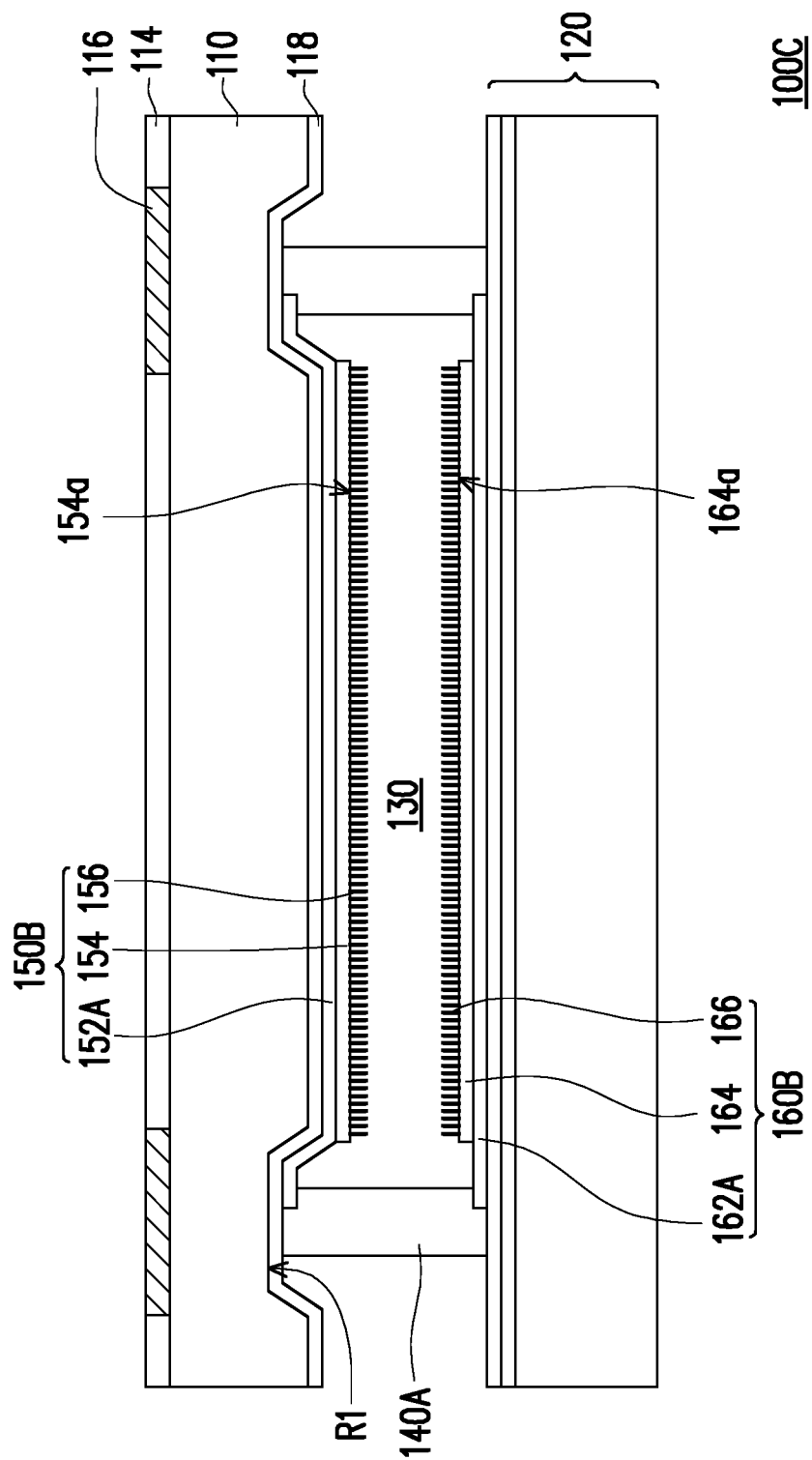

In FIG. 3B is shown a cross-sectional view of a display panel 100C according to another embodiment of the present disclosure. The structure of the display panel 100C shown in FIG. 3B may be an implementing example of an embodiment of the present disclosure. The display panel 100C shown in FIG. 3B is similar to the display panel 100B shown in FIG. 3A, and the same or similar reference numbers in the two embodiments represent the same or similar elements or components. The display panel 100C may include the first substrate 110, the anti-reflective layer 114, the light shielding layer 116, the conductive layer 118, the second substrate 120, the display medium layer 130, the sealant 140A, the first alignment layer 150B, and the second alignment layer 160B. The first substrate 110 may present the first recess R1 in the first region 102 of the display panel 100C, where the sealant 140A is located. As for the display panel 100B of FIG. 3, also in the display panel 100C, the sealant 140A is disposed in the first recess R1. A difference between the display panel 100C shown in FIG. 3B and the display panel 100B shown in FIG. 3A is that the sealant 140A partly covers the first and second organic alignment layers 152A and 162A. That is, the first and second organic alignment layers 152A and 162A extend further into the recess R1 or over the bottom substrate 120 than the first and second organic alignment layers 152 and 162 of the display panel 100B shown in FIG. 3A. Another difference between the display panel 100C of FIG. 3B and the display panel 100B of FIG. 3A is that the first alignment layer 150B may further include a first hydrophobic material layer 156 formed on the first inorganic alignment layer 154 and the second alignment layers 160B may further include a second hydrophobic material layer 166 formed on the second inorganic alignment layer 164.

The first and second hydrophobic material layers 156 and 166 are respectively disposed on the surfaces 154a and 164a of the first and second inorganic alignment layers 154 and 164. The surfaces 154a and 164a are the surfaces of the first and second inorganic alignment layers 154 and 164 which interface with the display medium layer 130. The first and second hydrophobic material layers 156 and 166 may include hydrophobic molecules, such as silanes, fluorinated silanes, acids, or long-chain alcohols. In some embodiments, if the material of the first and second inorganic alignment layers 154 and 164 is obliquely deposited silicon oxide, a resulting silane sidechain attached to silicon atoms at the surfaces 154a and 164a may be Si—O—Si(ROH)$_2$—R'—CH$_3$ or Si—O—Si(ROH)$_2$—(CF$_2$)$_n$—CF$_3$, where R and R' are alkyl chains which may be different from each other and n, an integer number, represents the number of the carbon atoms of the alkyl chain. In some embodiments including the aforementioned silane or a similar coating, the coated surfaces 154a and 164a of the first and second inorganic alignment layers 154 and 164 may have a water contact angle greater than 60 degrees. Because of the attached hydrophobic molecules, the increased hydrophobicity of the surfaces 154a and 164a may further facilitate pre-tilting and vertical alignment of the material of the display medium layer 130.

The fabrication process of the display panels 100B and 100C differ from the fabrication process of the display panel 100A in that, prior to assembly of the display panel, the first organic alignment layer 152 or 152A and the first inorganic alignment layer 154 may be formed on top of the conductive layer 118. The method of forming the first organic alignment layer 152 or 152A (and the second organic alignment layer 162 or 162A on the second substrate 120 shown in FIG. 3A) may include ink-jet printing or spin-coating and may further include patterning to form the desired pattern, but the method is not limited thereto. The method of forming the first inorganic alignment layer 154 (or the second inorganic alignment layer 164 shown in FIG. 1) may include thermal evaporation of the desired material, but the method is not limited thereto.

For the display panel 100C, the first and second hydrophobic material layers 156 and 166 are further respectively formed on the surfaces 154a and 164a of the first and second inorganic alignment layers 154a and 164a. The disposing of the first and second hydrophobic material layers 156 and 166 on the surfaces 154a and 164a of the first and second inorganic alignment layers 154 and 164 may involve a surface treatment or modification process, such as a silane surface treatment process through, for example, chemical vapor deposition. The surfaces 154a and 164a may be treated in isolation by shielding other areas beyond the first and second inorganic alignment layers 154 and 164 with the use of a mask (not shown) or by other selective deposition techniques. In some embodiments, a region corresponding to the gap G, or, in general, to the portions of the first and second organic alignment layers 152A and 162A left exposed by the first and second inorganic alignment layers 154 and 164, may be shielded during the formation of the first and second hydrophobic material layers 156 and 166, such that the first and second organic alignment layers 152A and 162A may not be subjected to the hydrophobic treatment.

Figure 3C:
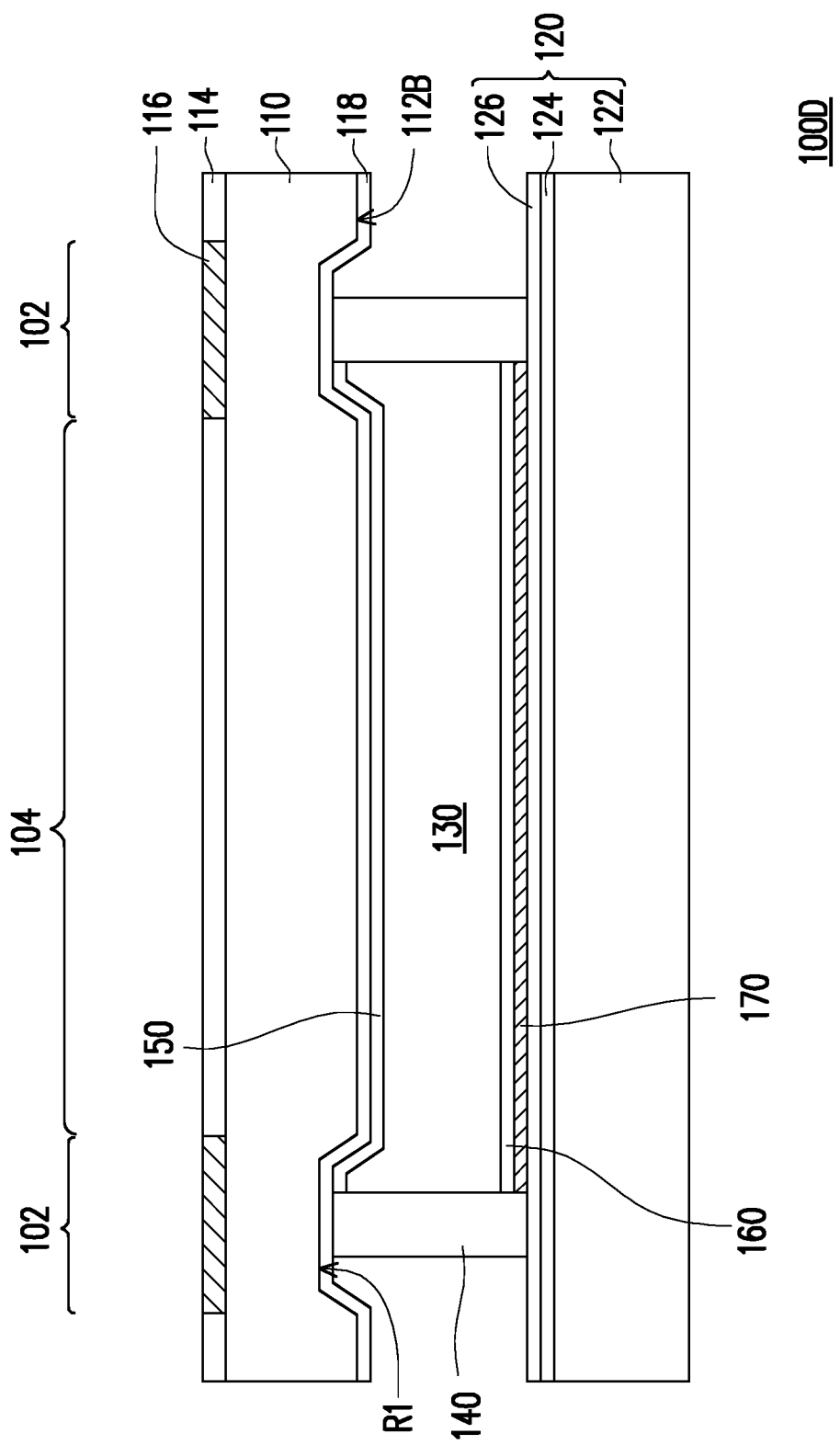

In FIG. 3C is shown a cross-sectional view of a display panel 100D according to another embodiment of the present disclosure. The structure of the display panel 100D shown in FIG. 3C may be an implementing example of an embodiment of the present disclosure. The display panel 100D shown in FIG. 3C is similar to the display panel 100A shown in FIG. 1, and the same or similar reference numbers in the two embodiments represent the same or similar elements or components. The display panel 100D having the first region 102 surrounding the second region 104 served as the display region may include the first substrate 110, the anti-reflective layer 114, the light shielding layer 116, the conductive layer 118, the second substrate 120, the display medium layer 130, the sealant 140, the first alignment layer 150, and the second alignment layer 160. The first substrate 110 may present the first recess R1 in the first region 102 of the display panel 100D, where the sealant 140 is located. As for the display panel 100A of FIG. 1, also in the display panel 100D the sealant 140 is disposed in the first recess R1. The display panel 100D of FIG. 3C differs from the display panel 100A of FIG. 1 as a color filter 170 is disposed between the second alignment layer 160 and the second substrate 120 in the second region 104 of the display panel 100D. In some embodiments, a peripheral portion of the color filter 170 may be disposed within the first region 102 of the display panel 100D. In some alternative embodiments, a span of the color filter 170 may match or slightly exceed a span of the second alignment layer 160, but the disclosure is not limited thereto.

Figure 3D:
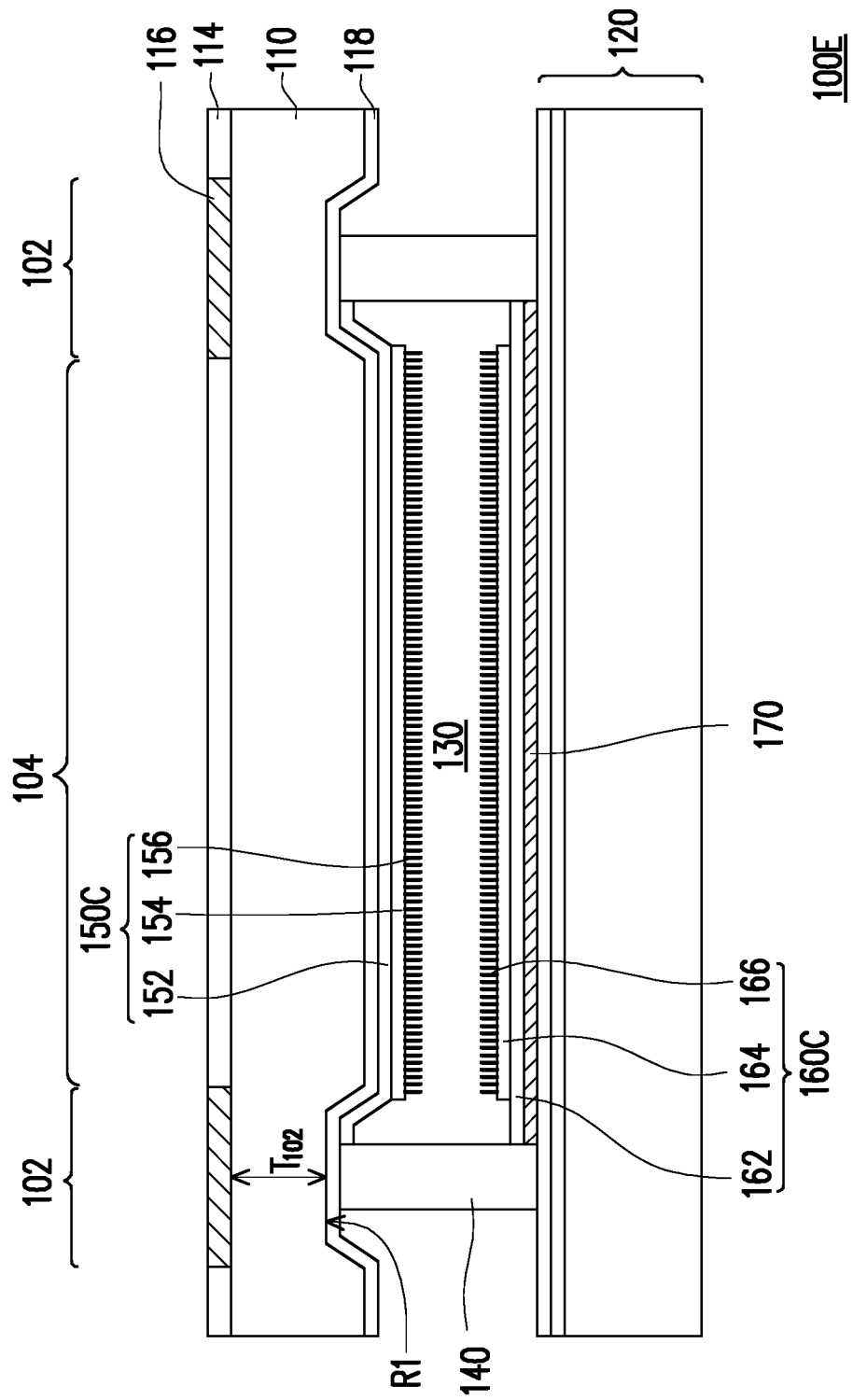

In FIG. 3D is shown a cross-sectional view of a display panel 100E according to another embodiment of the present disclosure. The structure of the display panel 100E shown in FIG. 3D may be an implementing example of an embodiment of the present disclosure. The display panel 100E shown in FIG. 3D is similar to the display panel 100C shown in FIG. 3B, and the same or similar reference numbers in the two embodiments represent the same or similar elements or components. The display panel 100E having the first region 102 surrounding the second region 104 served as the display region may include the first substrate 110, the anti-reflective layer 114, the light shielding layer 116, the conductive layer 118, the second substrate 120, the display medium layer 130, the sealant 140, the first alignment layer 150C, and the second alignment layer 160C. In the display panel 100E, the first and second organic alignment layers 152 and 162 extend up to the sealant 140, without overlapping it, as discussed with reference to the display panel 100B of FIG. 3A. The first and second hydrophobic material layers 156 and 166 are formed on the first and second inorganic alignment layer 154 and 164, respectively, similarly to what discussed with reference to the display panel 100C of FIG. 3B. Furthermore, the display panel 100E of FIG. 3D further includes the color filter 170 disposed between the second organic alignment layer 162 and the second substrate 120 in the second region 104, similarly to what discussed with reference to the display panel 100D of FIG. 3C. In some embodiments, the span of the color filter 170 matches or slightly exceed the span of the second hydrophobic material layer 166.

It is to be understood that, in some embodiments, all the display panels of the present disclosure may include one or both of the first and second hydrophobic material layers 156 and 166. According to some embodiments, overlap between the sealant 140A and the first and second organic alignment layers 152A and 162A is possible for all the display panels of the present disclosure. Furthermore, in some embodiments, all the display panels of the present disclosure may include the color filter 170.

Figure 4A:
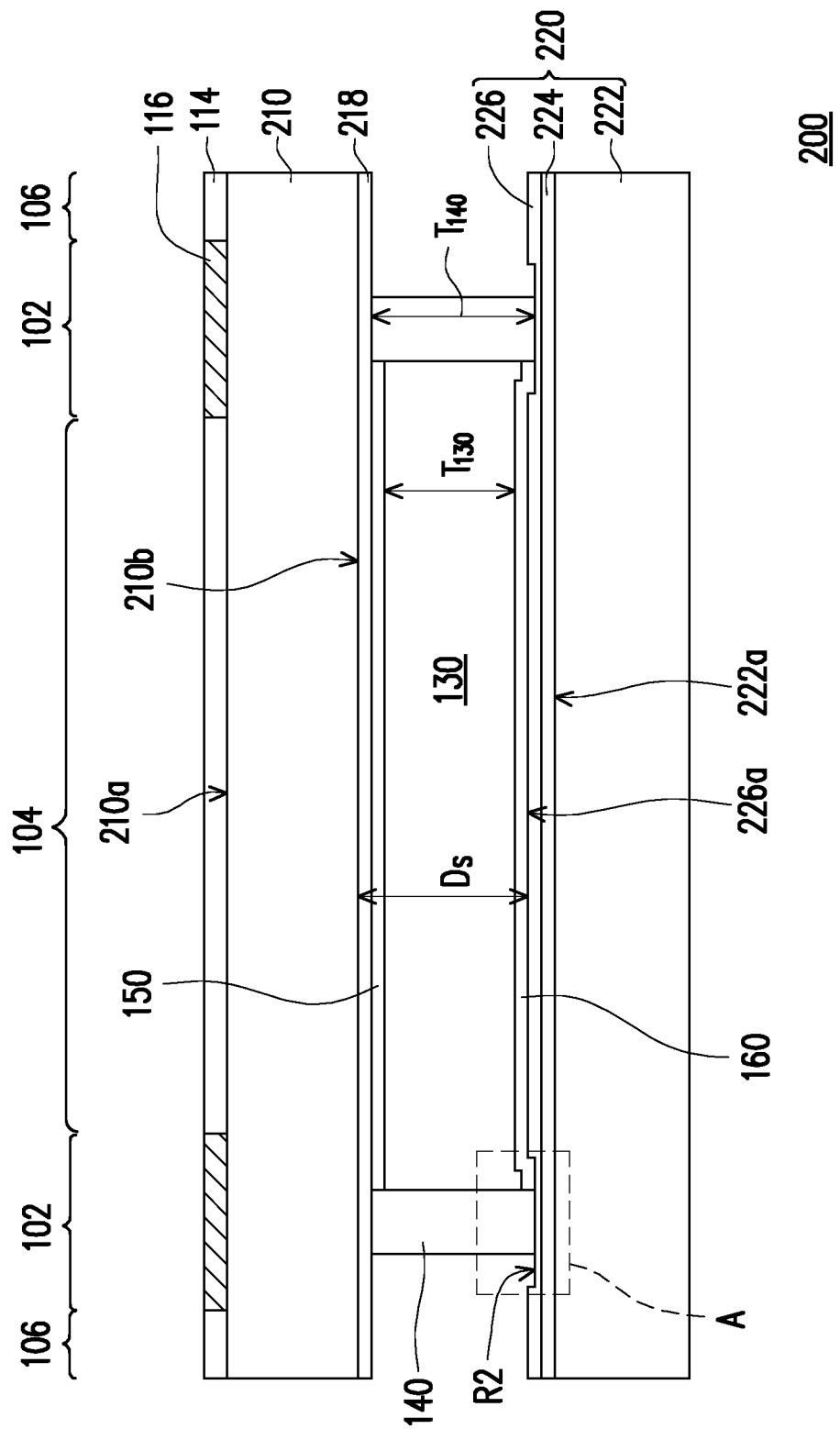
FIG. 4A shows a schematic cross-sectional view of a display panel according to an embodiment of the present disclosure.

In FIG. 4A is shown a cross section of a display panel 200 according to another embodiment of the present disclosure. The structure of the display panel 200 shown in FIG. 4A may be an implementing example of an embodiment of the present disclosure. The display panel 200 shown in FIG. 4A is similar to the display panel 100 shown in FIG. 1, and the same or similar reference numbers in the two embodiments represent the same or similar elements or components. The display panel 200 may include the first substrate 210, the anti-reflective layer 114, the light shielding layer 116, the conductive layer 218, the second substrate 220, the display medium layer 130, the sealant 140, the first alignment layer 150, and the second alignment layer 160. In some embodiments, the anti-reflective layer 114 and the light shielding layer 116 are formed on the first surface 210a of the first substrate 210 further away from the display medium layer 130. A difference between the display panel 200 of FIG. 4A and the display panel 100A of FIG. 1 is that the first substrate 210 does not include a recess. In some embodiments, portions of the second surface 210b of the first substrate 210 closer to the display medium layer 130 in the first region 102, in the second region 104, and in the third region 106 are substantially coplanar. In other words, no first recess is formed in the first substrate 210. The conductive layer 218 is conformally disposed on the second surface 210b of the first substrate 210. In other words, the conductive layer 218 may be a flat layer.

In some embodiments, the second substrate 220 includes the base plate 222 having an active device layer 224 formed thereon, and a passivation layer 226 disposed on the active device layer 224. In some embodiments, the base plate 222 includes a silicon bulk, and the active device layer 224 includes a plurality of complementary metal-oxide semiconductor devices formed in the silicon bulk. In some embodiments, the active device layer 224 may include a thin film transistor array. In some embodiments, the active device layer 224 may be formed on a surface 222a of the base plate 222 closer to the display medium layer 130, and extends continuously within the first region 102 and the second region 104. In some embodiments, the active device layer 224 further extends within the third region 106.

In the present embodiment, the passivation layer 226 covers the active device layer 224. The passivation layer 226 is interposed between the sealant 140 and the active device layer 224 in the first region 102, and between the active device layer 224 and the second alignment layer 160 in the second region 104. In some embodiments, a material of the passivation layer 226 includes organic insulating materials, such as polymer-based insulating materials, or inorganic insulating materials such as oxides or nitrides. In some embodiments, the passivation layer 226 may be formed by spin-on coating, chemical vapor deposition (CVD), plasma-enhanced chemical vapor deposition (PECVD), or the like, but the disclosure is not limited thereto.

In addition, a second recess R2 is formed within the second substrate 220, and the sealant 140 is received in the second recess R2. In some embodiments, as the sealant 140 is received in the second recess R2, the thickness $T_{140}$ of the sealant 140 may be larger than the distance $D_S$ between the first substrate 210 and the second substrate 220 in the second region 104 of the display panel 200. In the present embodiment, the distance $D_S$ is measured as the distance between the second surface 210b of the first substrate 210 and a surface 226a of the passivation layer 226 closer to the display medium layer 130. In some embodiments, the thickness $T_{140}$ of the sealant 140 is greater than the thickness $T_{130}$ of the display medium layer 130. In some embodiments, the thickness $T_{130}$ of the display medium layer 130 may be smaller than 2 μm. The sealant 140 is received in the second recess R2 so that sealing with low compressibility may be used even in the display panels requiring a small thickness of the display medium layer 130.

Figure 4B:
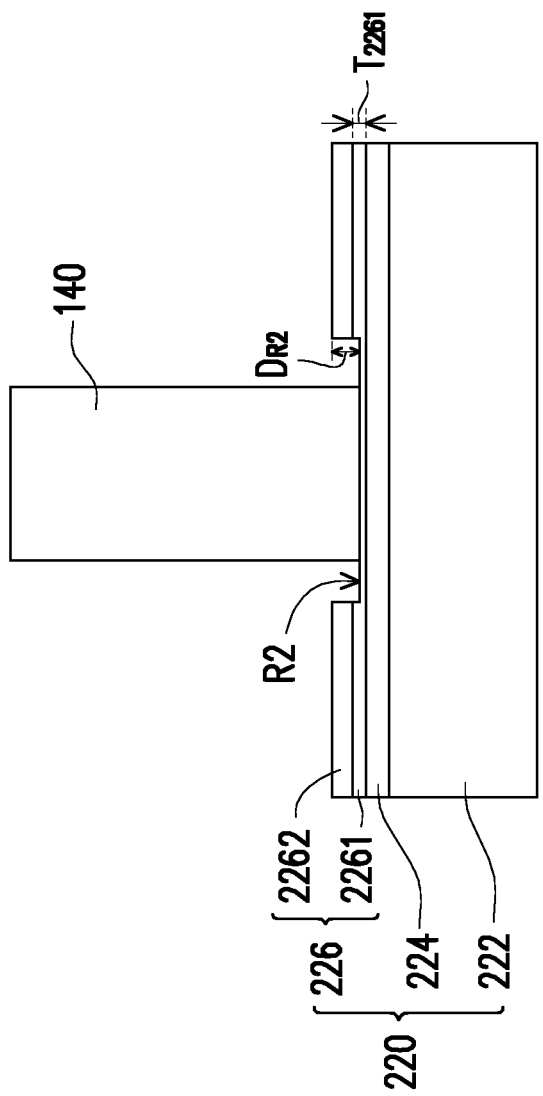
FIG. 4B and FIG. 4C show schematic cross-sectional views of an enlarged portion of a display panel according to an embodiment of the present disclosure.
Figure 4C:
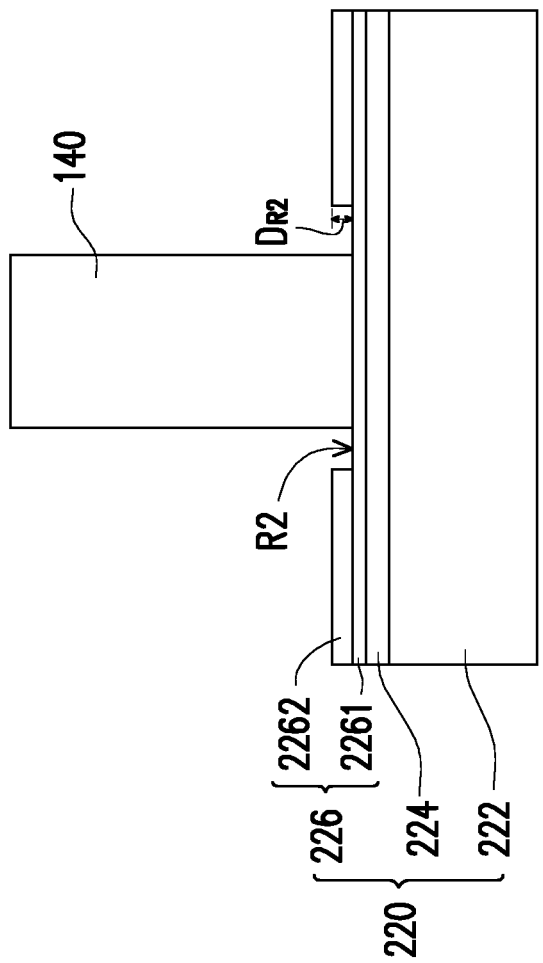

In FIG. 4B is shown an enlarged view of a portion of a display panel according to some embodiments of the present disclosure. The enlarged portion shown in FIG. 4B corresponds to the portion inscribed in the area A shown in FIG. 4A. FIG. 4B only illustrates the second substrate 220 and the sealant 140 for descriptive purpose. In some embodiments the passivation layer 226 may include a plurality of insulation layers. As shown in FIG. 4B, in some embodiments the passivation layer 226 may include a first insulation layer 2261 and a second insulation layer 2262 stacked on the first insulation layer 2261. In some embodiments, the second recess R2 is formed by patterning the passivation layer 226. In some embodiments, a portion of the second insulation layer 2262 is removed by an etching step. In some embodiments, a corresponding portion of the first insulation layer 2261 may also be removed, but the etching step is carried out in such a way that a depth $D_{R2}$ of the second recess R2 is insufficient to pass throughout a thickness $T_{2261}$ of the first insulation layer 2261. In other words, at least a portion of the first insulation layer 2261 is interposed between the active device layer 224 and the sealant 140. In some alternative embodiments as shown in FIG. 4C, only a portion of the second insulation layer 2262 is removed to form the second recess R2. In some embodiments, a material of the first insulation layer 2261 is different than a material of the second insulation layer 2262, so that selective etching conditions may be applied to form the second recess R2 of the desired depth $D_{R2}$.

According to some embodiments, the display panel in accordance with any of the embodiments of the present disclosure may have a multi-layered passivation layer 226. Furthermore, the display panel 200 may further include a color filter (not shown in FIG. 4A), as discussed with reference to the display panel 100D of FIG. 3C. The display panel 200 may further include hydrophobic material layers (not shown in FIG. 4A) formed on one or both of the alignment layers 150 and 160, as discussed with reference to the display panel 100C shown in FIG. 3B. In addition, the display panel 200 may include both the color filter and the hydrophobic material layers, as discussed with reference to the display panel 100E of FIG. 3D.

Figure 5:
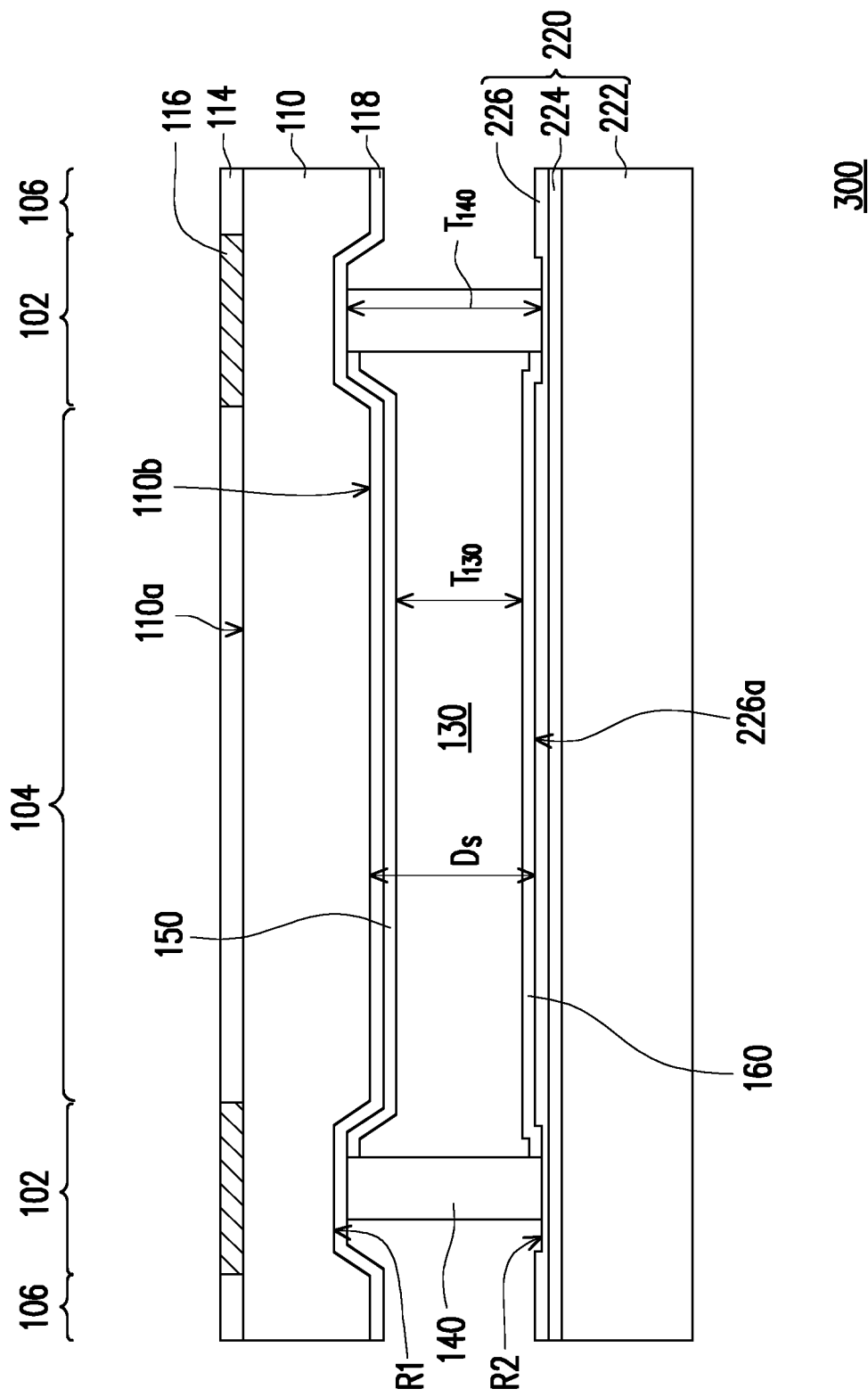
FIG. 5 shows a schematic cross-sectional view of a display panel according to some embodiments of the present disclosure.

In FIG. 5 is shown a cross section of a display panel 300 according to another embodiment of the present disclosure. The structure of the display panel 300 shown in FIG. 5 may be an implementing example of an embodiment of the present disclosure. The display panel 300 shown in FIG. 5 includes features similar to the display panel 100A shown in FIG. 1, and features similar to the display panel 200 shown in FIG. 4A, and the same or similar reference numbers in the three embodiments represent the same or similar elements or components. The display panel 300 of FIG. 5 may include a first substrate 110 having a first recess R1 formed therein as the display panel 100A of FIG. 1, and a second substrate 220 having a second recess R2 formed therein as the display panel 200 of FIG. 4A. The display panel 300 may further include the anti-reflective layer 114, the light shielding layer 116, the conductive layer 118, the display medium layer 130, the sealant 140, the first alignment layer 150 and the second alignment layer 160. The anti-reflective layer 114 and the light shielding layer 116 may be disposed on the surface 110a of the first substrate 110 further away from the display medium layer 130. The second substrate 220 may include the base plate 222, the active device layer 224 and the passivation layer 226. The conductive layer 118 is conformally disposed over the second surface 110b of the first substrate 110, and follows the profile of the first recess R1 in the first region 102 of the display panel 300. The sealant 140 encircles the display medium layer 130 and is received in the first recess R1 of the first substrate 110 and the second recess R2 of the second substrate 220. In other words, a vertical projection of the first recess R1 falls over a span of the second recess R2, so that the sealant 140 may be simultaneously disposed in both recesses R1 and R2. By having the sealant 140 disposed in the recesses R1 and R2 in the first region 102 of the display panel 300, the thickness $T_{140}$ of the sealant 140 may be greater than the distance $D_S$ between the first substrate 110 and the second substrate 220 in the second region 104 of the display panel 300. In some embodiments, the distance $D_S$ is measured as the distance between the second surface 110b of the first substrate 110 and the surface 226a of the passivation layer 226 closer to the display medium layer 130 in the second region 104 of the display panel 300. In some embodiments, the thickness $T_{140}$ of the sealant 140 is greater than the thickness $T_{130}$ of the display medium layer 130. In some embodiments, the thickness $T_{130}$ of the display medium layer 130 may be smaller than 2 μm.

In some embodiments, the conductive layer 118 is disposed between the sealant 140 and the first substrate 110. In some embodiments, at least a portion of the passivation layer 226 is disposed between the sealant 140 and the active device layer 224 while the portion of the passivation layer 226 may be thinner than the other portions of the passivation layer 226. In some embodiments, the passivation layer 226 may have a multi-layered structure as previously discussed with reference to FIG. 4B and FIG. 4C. Furthermore, the display panel 300 may further include a color filter (not shown in FIG. 5), as discussed with reference to the display panel 100D of FIG. 3C. The display panel 300 may further include hydrophobic material layers (not shown in FIG. 5) formed on one or both of the alignment layers 150 and 160, as discussed with reference to the display panel 100C shown in FIG. 3B. In addition, the display panel 300 may include both the color filter and the hydrophobic material layers, as discussed with reference to the display panel 100E of FIG. 3D.

In light of the foregoing, a display panel according to an embodiment of the disclosure includes a sealant disposed between a first substrate and a second substrate in a first region of the display panel. One or both of the first substrate and the second substrate may present a recess in the first region where the sealant is received. By having the sealant disposed within the recess of the first substrate or the second substrate, a thickness of the sealant may be greater than a distance between the first substrate and the second substrate in a second region of the display panel. The second region of the display panel may be surrounded by the first region, and may act as a display area for the display panel. The possibility of having a thicker sealant in the first region expands the range of possible materials usable for the sealant even when designing display panel having a particularly thin display medium layer (small gap) disposed between the first substrate and the second substrate in the second region of the display panel.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure, provided these falls within the scope of the following claims and their equivalents.

What is claimed is:

1. A display panel having a first region and a second region encircled by the first region, the display panel comprising:
    a first substrate having a first recess in the first region;
    a second substrate opposite to the first substrate;
    a sealant disposed between the first substrate and the second substrate and received by the first recess;
    a conductive layer disposed on the first substrate, covering the first recess and interposed between the first substrate and the sealant;
    a display medium layer disposed between the first substrate and the second substrate and encircled by the sealant,
    wherein a thickness of the sealant is larger than a distance between the first substrate and the second substrate in the second region of the display panel;
    a first alignment layer disposed between the display medium layer and the first substrate; and
    a second alignment layer disposed between the display medium layer and the second substrate,
    wherein one or both of the first alignment layer and the second alignment layer comprise an inorganic alignment layer and an organic alignment layer, the inorganic alignment layer is disposed between the display medium and the organic alignment and is spaced from the sealant by a gap, and the organic alignment layer is located in the gap and is in physical contact with the sealant.

2. The display panel of claim 1, wherein a width of the first recess is greater than a width of the sealant.

3. The display panel of claim 1, wherein the display panel further has a third region, the first region is positioned between the third region and the second region, and the conductive layer disposed on the first substrate continuously extends from the second region, passes through the first region and reaches the third region to cover the first recess in a conformal manner.

4. The display panel of claim 3, wherein the first substrate has a first thickness at the first region, a second thickness at the second region and a third thickness at the third region, and the first thickness is smaller than either the second thickness or the third thickness.

5. The display panel of claim 1, wherein side surfaces of the first recess are tapered.

6. The display panel of claim 1, further comprising a light shielding layer disposed on an outer surface of the first substrate further away from the display medium layer, and a vertical projection of the first recess falls on the light shielding layer.

7. The display panel of claim 6, wherein a width of the light shielding layer is larger than a maximum width of the first recess.

8. The display panel of claim 1, wherein a depth of the first recess is smaller than a half of the thickness of the first substrate at the second region.

9. The display panel of claim 1, wherein a thickness of the display medium layer is smaller than 2 μm.

10. The display panel of claim 1, wherein the second substrate comprises a base plate and a passivation layer disposed over the base plate, and a second recess is formed in the passivation layer at the first region, and the sealant is received by the second recess.

11. The display panel of claim 10, wherein the second substrate further comprises an active device layer covered by the passivation layer, and the passivation layer is interposed between the sealant and a portion of the active device layer.

12. The display panel of claim 11, wherein the base plate is a silicon bulk and the active device layer comprises a plurality of complementary metal-oxide-semiconductor devices formed in the silicon bulk.

13. The display panel of claim 1, wherein the sealant comprises a sealing material and a plurality of fillers distributed in the sealing material.

14. A display panel having a first region and a second region encircled by the first region, the display panel comprising:
    a first substrate;
    a second substrate opposite to the first substrate, wherein the second substrate comprises a base plate comprising silicon and a passivation layer disposed on the base plate, and a recess is formed in the passivation layer at the first region;
    a sealant disposed between the first substrate and the second substrate and received by the recess;
    a display medium layer disposed between the first substrate and the second substrate and encircled by the sealant,
    wherein a thickness of the sealant is larger than a distance between the first substrate and the second substrate in the second region of the display panel;

a first alignment layer disposed between the display medium layer and the first substrate; and a second alignment layer disposed between the display medium layer and the second substrate, wherein one or both of the first alignment layer and the second alignment layer comprise an inorganic alignment layer and an organic alignment layer, the inorganic alignment layer is disposed between the display medium and the organic alignment and is spaced from the sealant by a gap, and the organic alignment layer is located in the gap and is in physical contact with the sealant.

15. The display panel of claim 14, wherein the second substrate further comprises an active device layer formed in the base plate and covered by the passivation layer, and the passivation layer is interposed between the sealant and a portion of the active device layer.

16. The display panel of claim 14, wherein the passivation layer comprises a first insulation layer and a second insulation layer stacked on the first insulation layer.

17. The display panel of claim 16, wherein a depth of the recess is insufficient to pass throughout a thickness of the first insulation layer.

18. The display panel of claim 14, further having a third region, the first region being positioned between the third region and the second region, wherein the first alignment layer and the second alignment layer are absent in the third region.

19. The display panel of claim 14, wherein a thickness of the display medium layer is smaller than 2 μm.

* * * * *